United States Patent [19]
Zarouri

[11] Patent Number: 5,537,269
[45] Date of Patent: Jul. 16, 1996

[54] METHOD FOR LOADING THE SLIDER OF A HEAD GIMBAL ASSEMBLY

[75] Inventor: Mourad D. Zarouri, San Diego, Calif.

[73] Assignee: Dastek Corporation, San Jose, Calif.

[21] Appl. No.: 246,542

[22] Filed: May 20, 1994

[51] Int. Cl.$^6$ .............................. G11B 5/012; G11B 5/48
[52] U.S. Cl. ........................................ 360/97.01; 360/104
[58] Field of Search ................................. 360/97.01, 104

[56] References Cited

U.S. PATENT DOCUMENTS

| | | |
|---|---|---|
| 4,167,765 | 9/1979 | Watrous . |
| 4,783,710 | 11/1988 | Salyer et al. . |
| 4,797,763 | 1/1989 | Levy ........................................ 360/103 |
| 4,933,785 | 6/1990 | Morehouse et al. . |
| 5,019,931 | 5/1991 | Ohwe ....................................... 360/104 |
| 5,025,335 | 6/1991 | Stefansky . |
| 5,025,336 | 6/1991 | Morehouse et al. . |
| 5,027,241 | 6/1991 | Hatch et al. . |
| 5,115,363 | 5/1992 | Khan et al. . |
| 5,138,507 | 8/1992 | Zarouri ..................................... 360/104 |
| 5,208,712 | 5/1993 | Hatch et al. . |
| 5,396,386 | 3/1995 | Bolasna ................................... 360/103 |

OTHER PUBLICATIONS

*Type 16 Suspension Assembly Characteristics Summary*, Hutchinson Technology, Jun. 20, 1991, (10 pages).

*Primary Examiner*—A. J. Heinz
*Attorney, Agent, or Firm*—Skjerven, Morrill, MacPherson, Franklin & Friel; David W. Heid

[57] ABSTRACT

A head gimbal assembly (HGA) for use with a magnetic head and disk assembly, and a method for loading the slider of a head gimbal assembly enable the read/write rail of the slider to fly at a desired height. According to one embodiment of the invention, the slider of the HGA has two rails: a read/write rail for data transduction and an inactive rail for balancing the read/write rail. A desired gram loading on the read/write rail of the slider is known from the performance characteristics of the magnetic head and disk assembly. During production of the HGA, the position of the slider with respect to the load arm is varied in a direction perpendicular to the longitudinal axis of the load arm. A load transducer is used to measure the gram loading on the rails of the slider. The slider is permanently mounted at a position at which the load on the read/write rail falls within a predetermined range about the desired gram loading value. Slider load variations are borne by the inactive rail. The magnitude of the planform areas of the surfaces of the inactive rail and read/write rail adjacent the disk may be varied relative to one another in order to control the roll angle of the slider with respect to the disk. The position of the slider relative to the load arm may also be varied in a direction parallel to the longitudinal axis of the load arm to obtain a desired pitch angle. The principles of the invention may be extended to sliders with more than two rails.

9 Claims, 5 Drawing Sheets

METHOD FOR LOADING THE SLIDER OF A HEAD GIMBAL ASSEMBLY

BACKGROUND OF THE INVENTION

1. Field of the Invention

This invention is related to a magnetic head and disk assembly and, in particular, to a head gimbal assembly for use with a magnetic head and disk assembly. More particularly, the invention is related to a head gimbal assembly, and a method for loading the slider of a head gimbal assembly such that, during data transduction, a desired distance is maintained between a read/write rail of the slider and the disk of the magnetic head and disk assembly.

2. Related Art

Figure 1A:
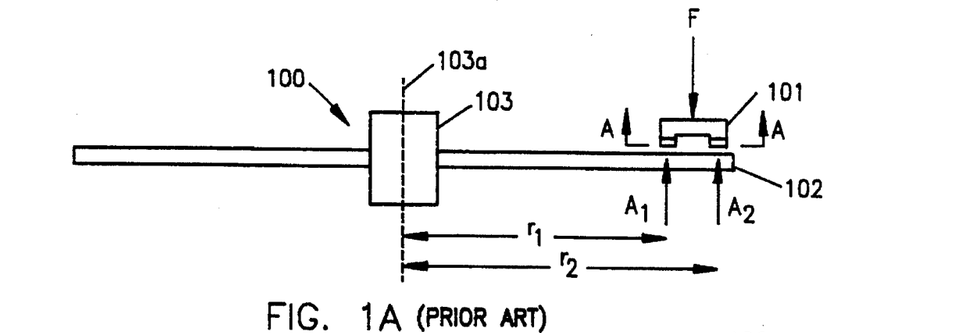
FIG. 1A is a simplified side view of a magnetic head and disk assembly.
Figures 1B, 1C:
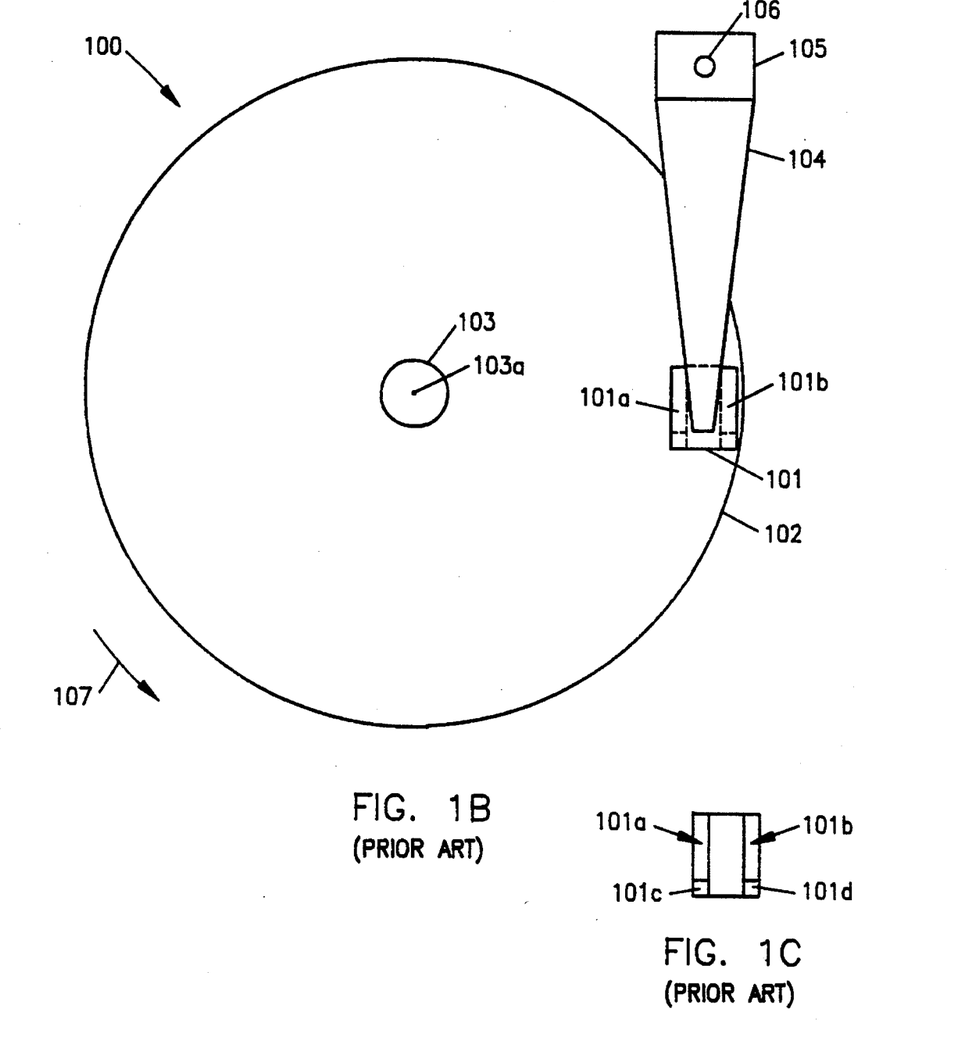
FIG. 1B is a simplified plan view of the magnetic head and disk assembly of FIG. 1A.
FIG. 1C is a plan view of the slider of the magnetic head and disk assembly of FIG. 1A, taken along section A—A in FIG. 1A, showing surfaces of the slider that are adjacent the disk.

FIG. 1A is a simplified side view of a magnetic head and disk assembly 100 including a slider 101 positioned over a disk 102 mounted on a spindle 103. FIG. 1B is a simplified plan view of the magnetic head and disk assembly 100 showing additionally a load arm 104 attached to a base plate 105 which is mounted on an actuator arm 106. The slider 101 is mounted on a flexure (not shown for simplicity) which is, in turn, attached to the end of the load arm 104 opposite the end of the load arm 104 attached to the base plate 105. The flexure, load arm 104 and base plate 105 together form a suspension. The suspension and slider together form a head gimbal assembly (HGA). During operation of the magnetic head and disk assembly 100, the actuator arm 106 is driven by a motor (not shown) to move the HGA so that the slider 101 is located over a desired area of the disk 102.

FIG. 1C is a plan view of the slider 101, taken along section A—A in FIG. 1A, showing surfaces of the slider 101 that are adjacent the disk 102. The slider 101 has two rails 101a and 101b. The rail 101b (read/write rail) includes a data transducer that is used to magnetically read and write data from and to the disk 102. The rail 101a (inactive rail) is used to balance the read/write rail 101b; the inactive rail 101a does not perform any data operations.

Each of the rails 101a and 101b has a beveled edge 101c and 101d, respectively. The beveled edges 101c and 101d are located so that the beveled edges 101c and 101d face into the direction of rotation 107 of the disk 100. The beveled edges 101c and 101d help lift the slider 101 off the disk 102 when the disk 102 starts to rotate at the beginning of operation of the magnetic head and disk assembly 100, as explained in more detail below.

When the magnetic head and disk assembly 100 is not operating, the disk 102 is at rest and the rails 101a and 101b of slider 101 are held in contact with the disk 102 by a spring force F ("gram loading") applied by the load arm 104 as shown in FIG. 1A. (Though the spring force F may be applied to an area of the slider 101, the spring force F can be resolved into a single force applied at a point, i.e., the "effective point of application," and is so shown in FIG. 1A.) During operation of the magnetic head and disk assembly 100, the disk 102 is driven to rotate through the spindle 103 by a motor (not shown). This rotation causes an airflow that strikes the beveled edges 101c and 101d, giving rise to aerodynamic forces $A_1$ and $A_2$ acting on rails 101a and 101b, respectively, as shown in FIG. 1A. (Though, in reality, the aerodynamic forces $A_1$ and $A_2$ act over the entire surface of the rails 101a and 101b, respectively, adjacent the disk 101, these forces can be resolved into a single force applied at a point, i.e., the "effective point of application," and are so shown in FIG. 1A.) As the speed of rotation of the disk 102 increases to operating speed, the aerodynamic forces $A_1$ and $A_2$ become sufficiently large to cause the rails 101a and 101b, respectively, to rise off of the surface of the disk 102.

Ideally, at the operating speed of the disk 102, the equilibrium between the load arm spring force F and the aerodynamic forces $A_1$ and $A_2$ results in a desired spacing of the rails 101a and 101b from the disk 102. The read/write rail 101b must be held above the disk 102 within a specified tolerance of the height necessary for proper data transduction as dictated by the performance characteristics (i.e., recording density of the disk 102, rotational speed of the disk 102, characteristics of the data transducer, etc.) of the magnetic head and disk assembly 100. The inactive rail 101a must be held above the disk 102 at a height sufficient to ensure clearance between the inactive rail 101a and the disk 102. Desirably, the inactive rail 101a is at the same height as, or a slightly greater height than, the read/write rail 101b above the disk 102. Illustratively, the height between the read/write rail 101b and the disk 102 is 5 microinches with a tolerance of 1 microinch, and the height of the inactive rail 101a is 0 to 1 microinches higher than the height of the active rail 101b. (The height of the inactive rail 101a may alternatively be specified by designating an allowable range of roll angles of the slider 101. The roll angle of a slider is measured in the plane of FIG. 1A.)

The magnitude of the force $A_1$ or $A_2$ is a function of (among other things) the speed of the airflow at the location of the effective point of application of the force $A_1$ or $A_2$. The speed of the airflow at any given disk location is proportional to the rotational speed of the disk 102 at that location, which is, in turn, proportional to the distance of that location from the axis of rotation 103a of the spindle 103. Therefore, the magnitude of each of the forces $A_1$ and $A_2$ is a function of the distance $r_1$ and $r_2$, respectively, between the axis of rotation 103a and the effective point of application of the force $A_1$ or $A_2$. As the distance from the axis of rotation 103a to the effective point of application of the aerodynamic force, e.g., force $A_1$, increases, the magnitude of the aerodynamic force, e.g., force $A_1$, increases.

Since the effective point of application of the force $A_2$ acting on the read/write rail 101b is a greater distance $r_2$ from the axis of rotation 103a than the distance $r_1$ of the effective point of application of the force $A_1$ acting on the inactive rail 101a, the force $A_2$ is greater than the force $A_1$. Therefore, assuming that the effective point of application of the spring force F is midway between the effective points of application of the aerodynamic forces $A_1$ and $A_2$, during operation of the magnetic head and disk assembly 100, the read/write rail 101b will be forced further away from the disk 102 than the inactive rail 101a, i.e., the slider 101 will have a non-zero roll angle. In practice, if the roll angle of the slider 101 is sufficiently large, then the desired heights of the rails 101a and 101b (as described above) may not be maintained.

As noted above, it is desirable that the read/write rail 101b be at a particular height above the disk 102 and that the inactive rail 101a be at a sufficient height above the disk 102. This may be done by applying a gram loading (i.e., spring force F) of appropriate magnitude to the slider 101 in a manner that gives rise to a differential load on the rails 101a and 101b that compensates for the differential aerodynamic forces $A_1$ and $A_2$ acting on the rails 101a and 101b, respectively, so as to keep the rails 101a and 101b at the desired heights. The differential loading can be accomplished by, for example, adjusting the effective point of application of the spring force F. If the effective point of application of the spring force F is moved toward the effective point of application of the aerodynamic force $A_2$, the height of rail 101b above the disk 102 will decrease and the height of rail 101a above the disk 102 will increase. Likewise, moving the effective point of application of the spring force F toward the effective point of application of the aerodynamic force $A_1$, results in decreasing the height of rail 101a above the disk 102 and increasing the height of the rail 101b. By appropriately locating the effective point of application of the spring force F, the heights of rails 101a and 101b above the disk 102 can be controlled as desired.

Figure 2A:
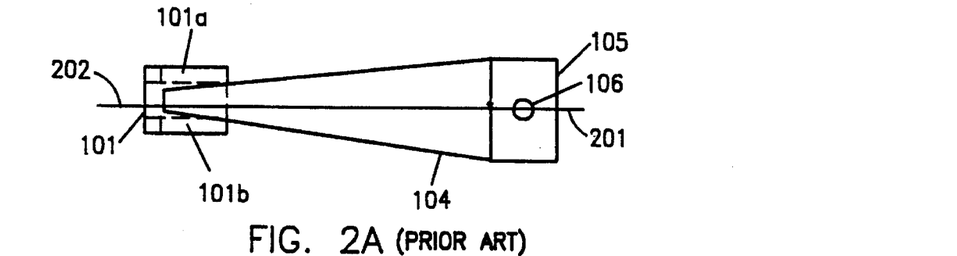
FIG. 2A is a simplified plan view of a slider, load arm and base plate with no bonded offset of the slider relative to the load arm.
Figure 2B:
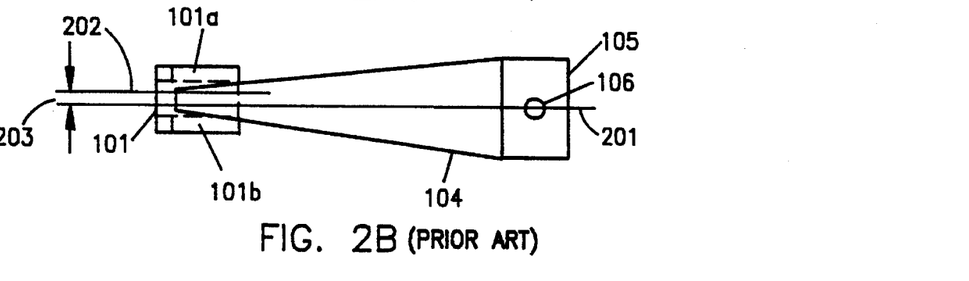
FIG. 2B is a simplified plan view of a slider, load arm and base plate with a bonded offset of the slider relative to the load arm.

As illustrated by FIGS. 2A and 2B, the effective point of application of the spring force F is moved by incorporating a "bonded offset" 203 (FIG. 2B) into the assembly of the slider 101 to the load arm 104. In FIG. 2A, the slider 101 is assembled to the load arm 104 such that the effective point of application of the spring force F lies in a plane 201 that is coincident with a plane 202 that lies midway between the effective points of application (not shown) of the aerodynamic forces $A_1$ and $A_2$. (Note that both planes 201 and 202 are parallel to the longitudinal axis of symmetry of the slider 101.) Since the spring force F is applied midway between the aerodynamic forces $A_1$ and $A_2$, the spring force F does not result in a moment that affects the roll angle of the slider 101, i.e., the spring force F equally affects the heights of the rails 101a and 101b.

In FIG. 2B, the slider 101 is assembled to the load arm 104 such that the plane 201 is offset (bonded offset 203) from the plane 202. In FIG. 2B, the bonded offset 203 is in the direction of the rail 101b, i.e., the effective point of application of the spring force F in FIG. 2B is moved toward the rail 101b relative to the effective point of application of the spring force F in FIG. 2A. Consequently, the rail 101b is at a lower height, and the rail 101a is at a higher height, than the corresponding heights when the slider 101 is assembled to the load arm 104 as in FIG. 2A. For example, with proper choice of bonded offset 203, the equilibrium between spring force F and aerodynamic forces $A_1$ and $A_2$ results in rails 101a and 101b being at equal heights from the disk 102. Conversely, the slider 101 can be assembled to the load arm 104 so that the plane 201 is offset in the opposite direction so that the rail 101b is at a higher height and the rail 101a is at a lower height than the corresponding heights in FIG. 2A.

There are several problems with this approach to loading the slider 101 that cause the rails 101a and 101b to be at other than the desired heights above the disk 102. First, in practice, the gram loading (i.e., spring force F) cannot be controlled precisely, i.e., a tolerance is associated with the gram loading. Typically, a nominal gram loading of 9.5 grams is used to bias the slider 101 against the disk 102. A typical tolerance is 0.75 grams. Thus, a magnetic head and disk assembly 100 assembled to achieve the desired height of the rails 101a and 101b above the disk 102 for a gram loading of 9.5 grams may, in fact, be subject to a gram loading of as little as 8.75 grams or as much as 10.25 grams.

Figure 3A:
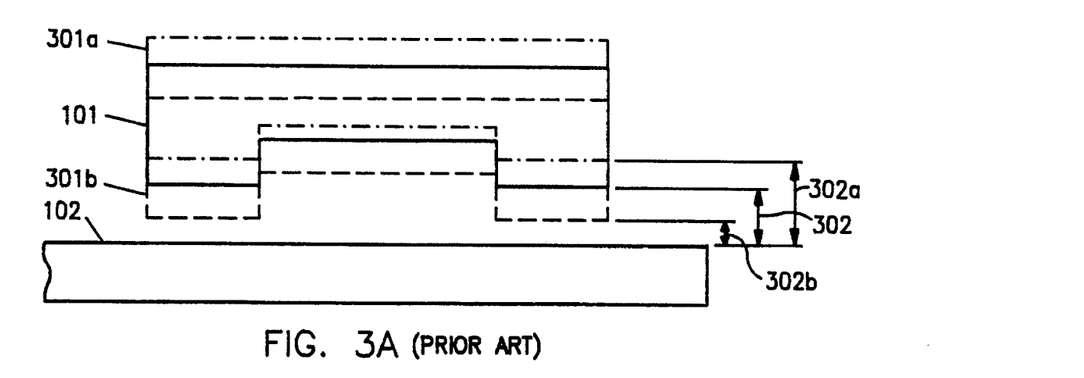
FIG. 3A is a simplified rear view of a slider and part of a disk illustrating the effects of gram loading tolerance.

FIG. 3A illustrates the effects of gram loading tolerance. For actual gram loading that is less than the nominal value, the slider 101 will be moved up (slider 301a represented by the dashed-dotted line) relative to the desired position. For actual gram loading that is greater than the nominal value, the slider 101 will be moved down (slider 301b represented by the dashed line) relative to the desired position. Thus, as a result of gram loading tolerance, rail 101a and/or rail 101b may be at a height, e.g., height 302a or 302b, from the disk 102 that is unacceptably higher or unacceptably lower than the desired height 302.

Second, in bonding the slider 101 to the load arm 104, the slider 101 may be misaligned so that the desired bonded offset 203 is not obtained. In practice, alignment of the slider 101 with the load arm 104 has, at best, a tolerance of about 0.002 inches. As a result of this misalignment, the plane 201 containing the effective point of application of the spring force F will be shifted from the desired location. The resulting equilibrium between spring force F and aerodynamic forces $A_1$ and $A_2$ results in rails 101a and 101b being at different heights from the disk 102 than desired, the lowered rail being the one toward which the spring force F is offset from the desired bonded offset 203.

Figure 3B:
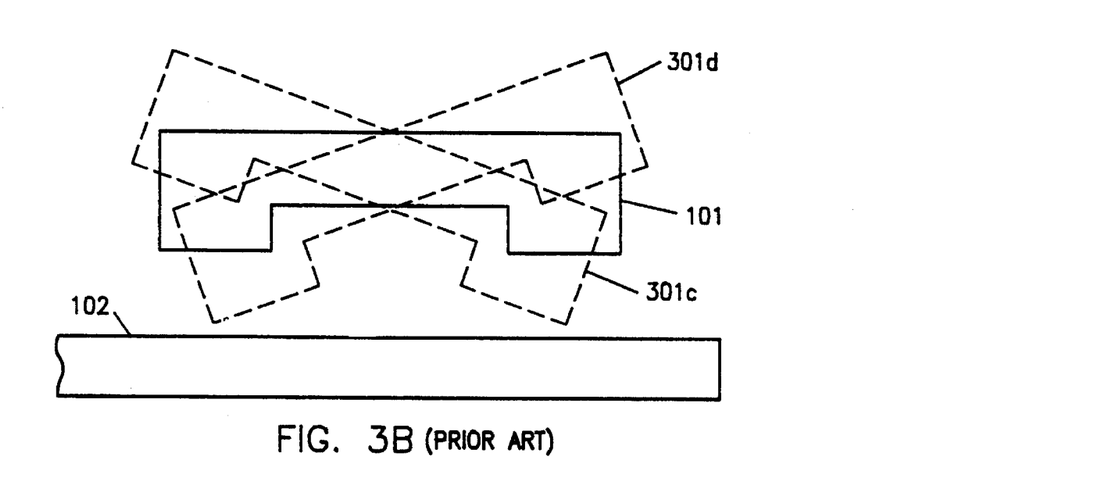
FIG. 3B is a simplified rear view of a slider and part of a disk illustrating the effects of alignment tolerance in positioning of the slider with respect to the load arm, and the effects of static attitude bias of the slider with respect to the disk.

FIG. 3B illustrates the effects of alignment tolerance in positioning of the slider 101 with respect to the load arm 104. If the slider 101 is misaligned toward the rail 101b, the rail 101b is tilted toward the disk 102 (as shown by the slider 301c). If the slider 101 is misaligned toward the rail 101a, the rail 101a is tilted toward the disk 102 (as shown by the slider 301d). Thus, as a result of alignment tolerance, the height of rail 101a and/or rail 101b may be unacceptable.

Third, the slider 101 may have a rotary spring bias (i.e., static attitude bias) with respect to the disk 102 when the disk 102 is at rest, such that one or the other of the rails 101a or 101b is closer to the disk 102 than the other (i.e., non-zero roll angle of the slider 101). This static attitude bias may arise from, for instance, the misorientation of the load arm/base plate attachment, load arm/flexure attachment or flexure/slider attachment; twist in the load arm or flexure; or manufacturing variations in formation of the load arm 104, flexure or slider 101. Static attitude bias can result in one or both of the rails 101a and 101b flying at an unacceptable height above disk 102. The effects of static attitude bias are also illustrated in FIG. 3B by the sliders 301c and 301d.

One method that has been used in an attempt to address the above problems is to, during assembly, vary the position of the slider 101 with respect to the load arm 104 to obtain a desired differential load between the gram loading on the read/write rail 101b and the gram loading on the inactive rail 101a. Typically, in this method, the gram loading of the read/write rail 101b is made a predetermined amount larger than the gram loading of the inactive rail 101a. If the overall gram loading of the slider 101 had no tolerance associated with it, this method could be used to produce the desired spacing between the rails 101a and 101b and the disk 102, since the effects of alignment tolerance of the slider 101 relative to the load arm 104 and static attitude bias of the slider 101 are eliminated.

However, as noted above, the overall gram loading is only known within a certain tolerance. Thus, the exact differential load necessary to provide the desired spacing of the rails 101a and 101b from the disk 102 cannot be known.

Thus, there is a need for a head gimbal assembly and a method of loading a slider for use with a magnetic head and disk assembly such that the read/write rail of the slider is maintained at a desired height above the disk, the roll angle of the slider is controlled, and clearance is maintained between the inactive rail and the disk.

SUMMARY OF THE INVENTION

According to the invention, a head gimbal assembly (HGA) for use with magnetic media is constructed so that the above-mentioned problems are overcome. A slider of the HGA is loaded so that the read/write rail of the slider flies at a desired height.

The head gimbal assembly according to the invention comprises a slider and structure for applying a force to the slider. The slider has a read/write rail for reading data from and writing data to magnetic media. The slider is attached to the structure for applying a force to the slider such that the structure exerts a force on the read/write rail that is within a predetermined amount of a predetermined magnitude.

The structure for applying a force to the slider can be, for example, a flexure and a load arm. The slider is attached to the flexure which is, in turn, attached to the load arm.

According to the method of the invention, a desired force (gram loading) on the read/write rail of the slider is known from the performance characteristics (i.e., desired height of the read/write rail above the magnetic media based upon factors such as the recording density of the magnetic media, speed of the magnetic media with respect to the slider, characteristics of the transducer, etc.) of the magnetic media and head gimbal assembly. Generally, the desired gram loading on the read/write rail is chosen such that at a predetermined speed of the magnetic media with respect to the slider, the distance between the read/write rail and the magnetic media is within a predetermined amount of a predetermined first distance and the distance between the inactive rail and the magnetic media is greater than a second predetermined distance.

During assembly of the slider to the structure for applying a force to the slider, the slider is located at various positions with respect to the structure for applying a force. A load transducer is used to measure the gram loading on the read/write rail of the slider at each position. The position of the slider with respect to the structure for applying a force is varied until the gram loading on the read/write rail falls within a predetermined amount of the desired gram loading. The slider is then permanently attached to the structure in this position. The slider can be attached at any of a continuum of positions with respect to the load arm.

In the head gimbal assembly according to the invention, as a consequence of the method according to the invention for constructing a head gimbal assembly, the slider load variations attributable to gram loading tolerance, alignment tolerance of the slider relative to the structure for applying a load to the slider, and static attitude bias of the slider with respect to the magnetic media are all transferred to one or more inactive rails of the slider.

In one embodiment of the invention, both the read/write rail and the inactive rail surfaces adjacent the magnetic media have the same planform area. In an alternative embodiment of the invention, inactive rail surfaces adjacent the magnetic media have a different planform area than the corresponding surfaces of the read/write rail. The different planform area of the inactive rail surfaces results in a greater or lesser aerodynamic force being exerted on the inactive rail when the magnetic media is in motion (relative to the embodiment of the invention in which the planform areas of the read/write rail and inactive rail surfaces adjacent the disk are the same), compensating for slider load variations that have been transferred to the inactive rail by the setting of the read/write rail gram loading.

In yet another embodiment of the invention, the slider has three or more rails: a read/write rail and two or more inactive rails. A desired gram loading on the read/write rail is known. According to the principles of the invention discussed above, the position of the slider with respect to a structure for applying a force to the slider is varied until a load transducer measures the desired gram loading on the read/write rail. The slider is then permanently attached in that position.

As for embodiments of the invention having a slider with two rails, in order to control slider roll angle, the planform areas of the surfaces of the inactive rails adjacent the magnetic media may be made different from each other and/or different from the planform area of the surfaces of the read/write rail adjacent the magnetic media.

DETAILED DESCRIPTION OF THE PREFERRED EMBODIMENTS

Figure 4A:
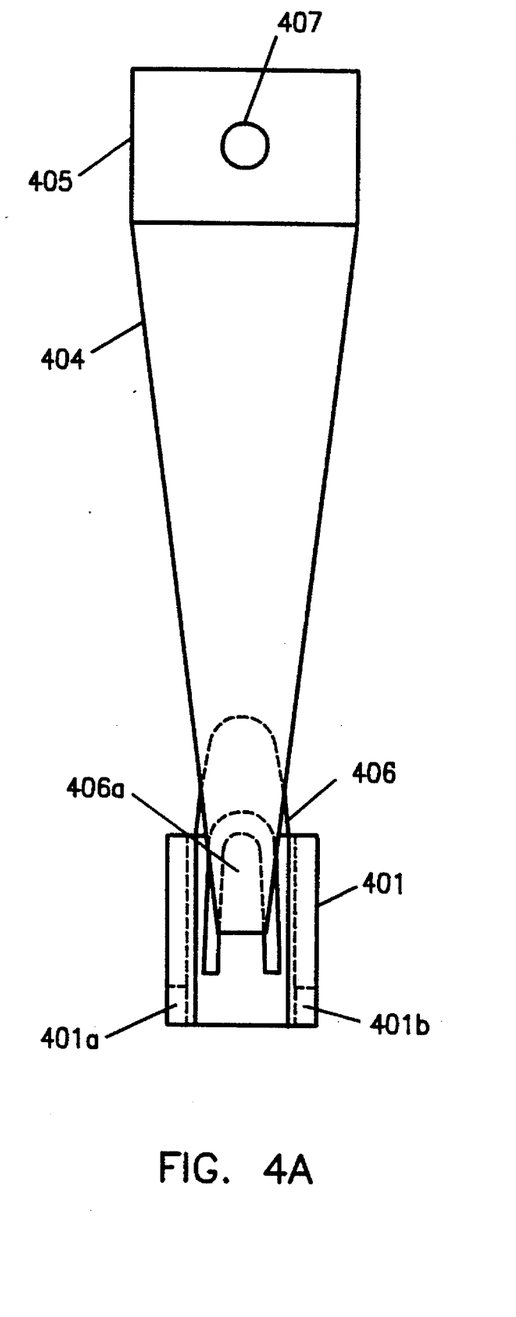
FIG. 4A is a plan view of a head gimbal assembly for use with a magnetic head and disk assembly according to the invention.
Figure 4B:
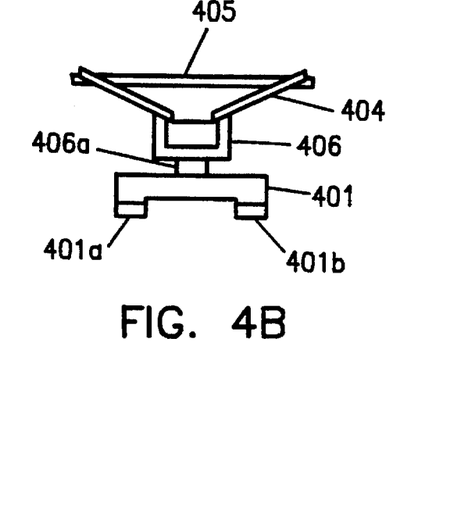
FIG. 4B is a front view of the head gimbal assembly of FIG. 4A.

FIGS. 4A and 4B are a plan view and front view, respectively, of a head gimbal assembly (HGA) for use with a magnetic head and disk assembly according to the invention. The HGA includes a slider 401 and a suspension. The suspension includes a flexure 406, load arm 404 and base plate 405. The slider 401, flexure 406, load arm 404 and base plate 405 are each made of materials and in a manner that are well known in the art. The load arm 404 is attached to the base plate 405, typically by swaging or by attaching the load arm 404 to the base plate 405 with one or more screws. The flexure 406 is attached to the load arm 404, typically by welding. The slider 401 is attached to a tongue 406a of the flexure 406 with, for example, an epoxy adhesive.

The flexure 406 and load arm 404 transmit a spring force (gram loading) that biases the slider 401 toward the disk. As explained in more detail below, when the disk is at rest, the gram loading holds the slider 401 against the disk. When the disk rotates, the gram loading acts in opposition to aerodynamic forces that lift the slider 401 away from the disk.

The flexure 406 also provides some isolation of the slider 401 from the load arm 404 so that angular misorientations of the load arm 404 are partially taken up by the flexure 406 rather than completely transferred to the slider 401 when the magnetic head and disk assembly is in operation (i.e., the disk is rotating). As a consequence of this isolation of the slider 401, the slider 401 is driven more completely by the aerodynamic forces that arise from the rotation of the disk.

The slider 401 has two rails 401a and 401b. The rail 401b (read/write rail) includes a data transducer that magnetically reads data from and writes data to the disk. The rail 401a (inactive rail) balances the rail 401b. During operation of the magnetic head and disk assembly, a drive motor (not shown) drives a conventional actuator arm 407 to which the base plate 405 is attached by, for instance, swaging, so that the read/write rail 401b of the slider 401 is positioned at selected locations adjacent the disk.

Figure 5A:
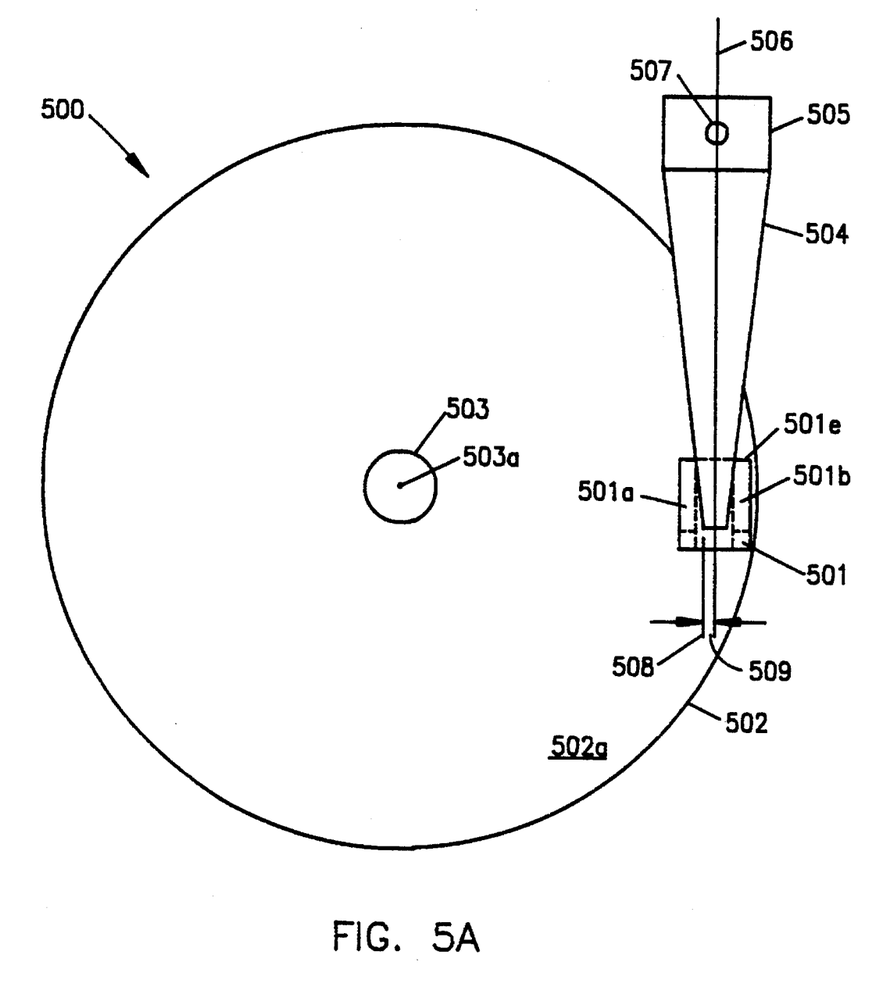
FIG. 5A is a simplified plan view of a magnetic head and disk assembly according to an embodiment of the invention illustrating the method according to the invention for gram loading the slider.
Figure 5B:
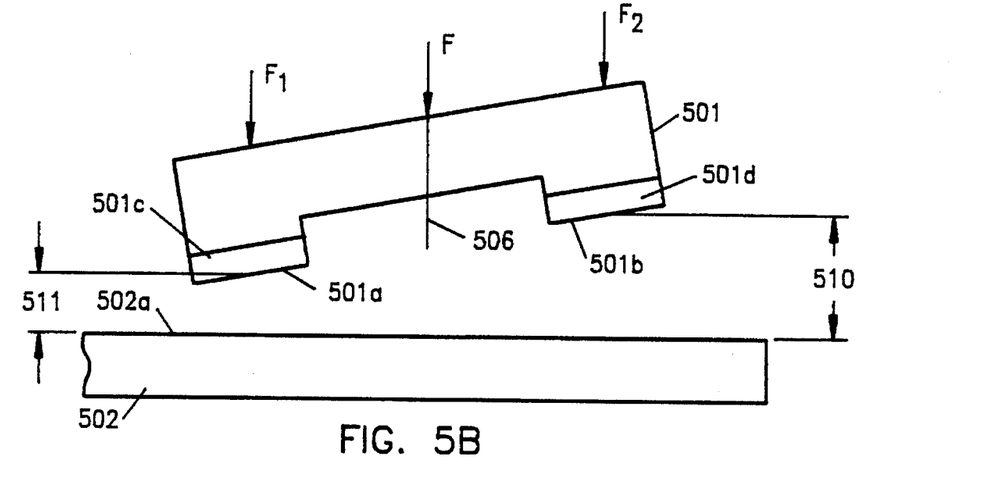
FIG. 5B is a simplified front view of the slider and part of the disk of FIG. 5A.

FIGS. 5A and 5B are a simplified plan view and front view, respectively, of a magnetic head and disk assembly 500 according to an embodiment of the invention, illustrating the method of loading the slider 501 according to the invention. As seen in FIG. 5A, a slider 501 is positioned over a disk 502 mounted on a spindle 503. The slider 501 is attached to a load arm 504 through a flexure (not shown). The end of the load arm opposite the end to which the slider 501 is mounted is attached to a base plate 505. The base plate 505 is attached to an actuator arm 507 which is driven by a motor (not shown) so that the slider 501 is positioned at desired locations adjacent the disk 502. The attachments of the various components, e.g., the attachment of the base plate 505 to the load arm 504, are made as described above with respect to FIGS. 4A and 4B.

Though the magnetic head and disk assembly 500 shown in FIG. 5A has only one disk and HGA, a plurality of disks and HGA's could be stacked along the axis of rotation 503a of the spindle 503. Only one disk and HGA is shown in FIG. 5A for ease and clarity of explanation of the operation of the magnetic head and disk assembly 500.

The slider 501 has a read/write rail 501b and an inactive rail 501a, as explained above with respect to FIGS. 4A and 4B. When the magnetic head and disk assembly 500 is not operating, the disk 502 is at rest and the rails 501a and 501b of slider 501 are held in contact with the disk 502 by a spring force F ("gram loading") applied by the load arm 504 through the flexure. During operation of the magnetic head and disk assembly 500, the disk 502 is driven to rotate through the spindle 503 by a motor. This rotation causes the air in the vicinity of the surface of the disk 502 to flow in the direction of rotation. Each of the rails 501a and 501b has a beveled edge 501c or 501d (FIG. 5B), respectively, that faces into the airflow such that when the disk 502 starts to rotate at the beginning of operation of the magnetic head and disk assembly 500, the airflow striking the beveled edges 501c and 501d gives rise to aerodynamic lift that forces the rails 501a and 501b off the disk 502.

The spring force F has an effective point of application in a plane 506 that is parallel to the longitudinal axis of the load arm 504. The effective point of application of the spring force F, i.e., the location of the plane 506, is located so that the rails 501a and 501b fly at desired heights above the disk 502. According to the invention, the location is chosen so that the read/write rail 501b flies at a desired height. For given operational characteristics of the magnetic head and disk assembly 500, this can be assured by locating the effective point of application of the spring force F so that a force of a specified magnitude is applied to the read/write rail 501b, as explained in more detail below. At the same time, the inactive rail 501a must fly at a height that is sufficiently far from the disk 502. Since, as described previously, the aerodynamic force acting on the inactive rail 501a is less than the aerodynamic force acting on the read/write rail 501b, in practice, frequently the plane 506 is offset toward the read/write rail 501b by a distance 509 from a plane 508 that lies midway between the effective points of application (not shown) of the aerodynamic forces and parallel to the rails 501a and 501b. However, this need not necessarily be the case.

As shown in FIG. 5B, the spring force F can be broken into component forces $F_1$ and $F_2$ (component gram loadings), $F_1$ acting on the inactive rail 501a and $F_2$ acting on the read/write rail 501b. The magnitude of the forces $F_1$ and $F_2$ (for a spring force F of a particular magnitude) is determined by the location of the effective point of application of the spring force F, e.g., the distance 509 between the planes 506 and 508 (FIG. 5A). For instance, as the distance 509 (measured in a direction toward the read/write rail 501b from the plane 508) decreases, the force $F_1$ increases and the force $F_2$ decreases. As the distance 509 increases, the force $F_1$ decreases and the force $F_2$ increases.

A desired component gram loading on the read/write rail 501b (i.e., force $F_2$) of the slider 501 is known from the performance characteristics (i.e., optimum height of the read/write rail 501b above the disk 502, desired recording density of the disk 502, rotational speed of the disk 502, characteristics of the transducer, etc.) of the magnetic head and disk assembly 500. The desired component gram loading $F_2$ is specified to achieve a desired height of the read/write rail 501b above the disk 502 within the tolerances (gram loading tolerance, slider/load arm alignment tolerance, etc.) of the production process used to assemble the HGA. For the desired component gram loading $F_2$, these tolerances must not result in the inactive rail 501a flying at an unacceptably low height with respect to the disk 502.

According to the invention, during production of the magnetic head and disk assembly 500, before the slider 501 is permanently mounted to the load arm 504 through the flexure, the slider 501 is temporarily mounted at various positions with respect to the load arm 504 such that the effective point of application of the spring force F is varied. At each position of the slider 501, the component gram loadings $F_1$ and $F_2$ on the rails 501a and 501b, respectively, are measured with load transducers according to known techniques. The load transducers are positioned along a line perpendicular to the plane 508. As the position of the slider 501 is varied, the component gram loadings $F_1$ and $F_2$ vary. In particular, for some position of the slider 501 with respect to the load arm 504, the component gram loading $F_2$ on the read/write rail 501b will have a magnitude that is within a specified tolerance of the desired component gram loading $F_2$ determined as discussed above. When this position is ascertained, the slider 501 is mounted permanently on the load arm 504.

Temporary attachment of the slider 501 can be accomplished by, for example, attaching the slider 501 to the flexure with an epoxy that cures only when exposed to ultraviolet light. Before curing, the epoxy is tacky so that the slider 501 is held in place on the flexure, but can also be removed and repositioned. When the desired position of the slider 501 is determined, the slider 501 is permanently attached to the flexure by flooding the epoxy with ultraviolet light, thus curing the epoxy. It is to be understood that other appropriate methods of temporarily and permanently attaching the slider 501 to the flexure can be used.

For a given magnitude of the overall gram loading F on the slider 501 and the component gram loading $F_2$ exerted on the read/write rail 501b (as obtained by the positioning of the slider 501 with respect to the load arm 504), the magnitude of the component gram loading $F_1$ exerted on the inactive rail 501a is fixed. Since the magnitude of the component gram loading $F_2$ on the read/write rail 501b is made equal or nearly equal to a particular desired value, the component gram loading $F_1$ on the inactive rail 501a will include all of the load variations described above with respect to FIGS. 3A and 3B. As shown in FIG. 5B, depending on the magnitude and direction of these load variations, the inactive rail 501a will be at a height 511 above the disk 502 that is greater than, lesser than or equal to the height 510 of the read/write rail 501b above the disk 502. In FIG. 5B, the height 511 is shown as less than the height 510; this need not be the case. The component gram loading $F_l$ on the inactive rail 501a is measured to verify that the component gram loading $F_1$ is not excessively large or small so that the inactive rail 501a does not fly unacceptably high or low with respect to the disk 502.

Thus, the method according to the invention overcomes the above-described load variation problems by directly controlling only the height of the read/write rail 501b. The height of the inactive rail 501a is allowed to "float" freely according to the actual variations in the magnitude of the gram loading, alignment of the gram loading, and the static attitude of the slider 501 from the nominal values. However, it is to be understood that, in practice, setting of the desired component gram loading $F_2$ on the read/write rail 501b is limited by the variations of these quantities from the nominal values, in that cumulation of the variations may cause the inactive rail 501a to fly at an unacceptable height above the disk 502.

Typically, a roll angle specification is established for the position of the slider 501 during operation of the magnetic head and disk assembly 500 so that the read/write rail 501b is at a desired height with respect to the inactive rail 501a, e.g., the height 510 is less than the height 511. At the same time, it is also desired to simultaneously achieve a particular height 510 of the read/write rail 501b. This can be done for the slider 501, having a gram loading according to the invention, by appropriately varying the aerodynamic force acting on the inactive rail 501a relative to the aerodynamic force acting on the read/write rail 501b. The relative aerodynamic forces may be varied by varying the planform area of the surfaces of the inactive rail 501a adjacent the disk 502 relative to the planform area of the surfaces of the rail 501b adjacent the disk 502. The planform area of the surfaces of the inactive rail 501a or read/write rail 501b adjacent the disk 502 is the projected area of the rail, e.g., inactive rail 501a, onto the disk 502 in a direction perpendicular to the disk surface 502a. The aerodynamic force acting on a rail, e.g., inactive rail 501a, varies directly with the magnitude of the planform area of the surfaces of the rail, e.g., inactive rail 501a, adjacent the disk 502.

In the embodiment of the invention shown in FIGS. 5A and 5B, the planform areas of the surfaces of the rails 501a and 501b adjacent the disk 502 are the same. In FIG. 5B, the various tolerances associated with the overall gram loading F exerted on the slider 501 are such that the inactive rail 501a flies nearer the disk 502 than the read/write rail 501b.

Figure 6A:
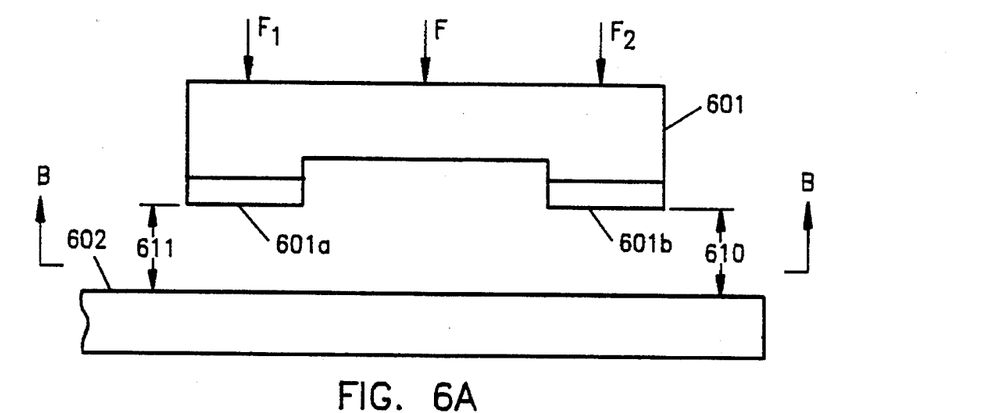
FIG. 6A is a simplified front view of a slider and part of a disk of a magnetic head and disk assembly according to another embodiment of the invention.
Figure 6B:
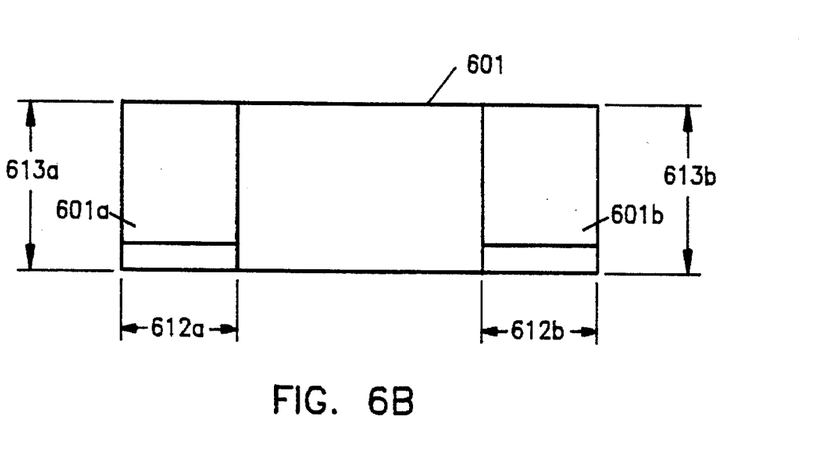
FIG. 6B is a plan view of surfaces of the slider of FIG. 6A that are adjacent the disk.

FIGS. 6A and 6B are a simplified front view and plan view, respectively, of another embodiment according to the invention of a slider 601 and part of a disk 602 in which the roll angle of the slider 601 is approximately zero. The slider 601 is identical to the slider 501 except that the inactive rail 601a of the slider 601 is made wider (in a direction perpendicular to the direction of the airflow past the slider) than the inactive rail 501a of the slider 501. As for the slider 501 of FIG. 5B, a spring force F (gram loading) is applied by a load arm (not shown) to the slider 601. The slider 601 is positioned relative to the load arm, as explained previously, to obtain a desired gram loading of the read/write rail 601b such that the desired height 610 between the read/write rail 601b and the disk 602 is achieved.

As shown in FIG. 6B, the planform area of the surfaces of the inactive rail 601a adjacent the disk 602 is greater than the planform area of the surfaces of the read/write rail 601b adjacent the disk 602. The planform areas of the surfaces of the read/write rail 501a and inactive rail 501b adjacent the disk 502, and the planform area of the surfaces of the read/write rail 601b adjacent the disk 602 are all the same. The larger planform area of the inactive rail 601a, relative to the planform area of the inactive rail 501a, results in a greater aerodynamic force being exerted on the inactive rail 601a, relative to the aerodynamic force exerted on the inactive rail 501a, during operation of the magnetic head and disk assembly. As a result, the inactive rail 601a will be at a greater height 611 above the disk 602 than the height 511 of the inactive rail 501a above the disk 502. As shown in FIG. 6A, by making the planform area of the inactive rail 601a sufficiently large, the roll angle of the slider 601 can be made approximately zero, in contrast to the non-zero roll angle of slider 501.

In FIG. 6B, the increase in planform area of the surfaces of the inactive rail 601a adjacent the disk 602 is achieved by increasing the width 612a of the inactive rail 601a relative to the width 612b of the read/write rail 601b. The lengths 613a and 613b of the inactive rail 601a and read/write rail 601b, respectively, are the same. It is to be understood that, alternatively, the planform area of the surfaces of the inactive rail 601a adjacent the disk 602 could be increased by increasing the length 613a of the inactive rail 601a relative to the length 613b of the read/write rail 601b, while leaving the widths 612a and 612b of the inactive rail 601a and read/write rail 601b, respectively, the same. More generally, it is within the ambit of the invention to increase the planform area of the surfaces of the inactive rail 601a adjacent the disk 602 by varying the width 612a and length 613a in any appropriate way. Additionally, the width 612a and length 613a can be also varied to decrease the planform area of the inactive rail 601a, if desired.

The embodiments of the invention described so far have included sliders with only two rails: a read/write rail and an inactive rail. The invention is broad enough to encompass sliders with more than two rails. For such sliders, one of the rails is a read/write rail and the remaining rails are inactive rails.

As for sliders with two rails, for sliders with more than two rails, the position of the slider with respect to the load arm is varied and the load on the read/write rail measured at each position. When a load is measured on the read/write rail that is within a specified tolerance of the desired gram loading on the read/write rail, the slider is fixed permanently with respect to the load arm. Load variation in the gram loading of the slider is borne by the inactive rails. The planform areas of the surfaces of the inactive rails adjacent the disk may be varied in any desired way in order to control the roll angle of the slider with respect to the disk.

In the above embodiments of the invention, the position of a slider relative to a load arm is varied, in a direction perpendicular to the airflow past the slider, so that a desired height of a read/write rail of the slider and a desired roll angle of the slider are achieved. In additional, embodiments of the invention, the position of the slider relative to the load arm can be varied in a direction parallel to the load arm so that a desired pitch angle of the slider can be achieved.

In these embodiments, a third load transducer is used in addition to the two load transducers described above. The third load transducer is positioned, for example, at the trailing edge of the slider (e.g., trailing edge 501e of slider 501 in FIG. 5A), so as to measure force exerted by the slider at a position displaced in a direction parallel to the longitudinal axis of the load arm from the positions at which force is measured by the other two load transducers, thereby allowing determination of the distribution of the gram loading of the slider along the load arm longitudinal axis. A predetermined distribution of the gram loading of the slider corresponds to the desired pitch angle. The position of the slider is varied by temporarily attaching the slider, in the same manner as described above with respect to FIGS. 5A and 5B, at various positions along the load arm longitudinal axis until the predetermined distribution of the gram loading of the slider is obtained.

Various embodiments of the invention have been described. The descriptions are intended to be illustrative, not limitative. Thus, it will be apparent to one skilled in the art that certain modifications may be made to the invention as described without departing from the scope of the claims set out below.

I claim:

1. A method for constructing a head gimbal assembly for use with a system for retrieving data from, and recording data to, a magnetic media comprising the steps of:

(a) providing a slider with at least two rails, at least one of said at least two rails supporting a read/write transducer for reading data from and writing data to said magnetic media, each of said at least two rails having planform areas with surfaces which face said magnetic media whereby, during system operation, aerodynamic forces are exerted on said planform area surfaces of said at least two rails in a direction away from the surface of said magnetic media;

(b) providing a means for applying a force to said slider in a direction towards the surface of said magnetic media, said force being used to balance said aerodynamic forces on said planform area surfaces during system operation and thereby maintain said slider at a distance above said magnetic media;

(c) determining a magnitude of force required on a first rail of said at least two rails in order to maintain said first rail at a predetermined distance above the surface of said magnetic media;

(d) positioning said slider and temporarily attaching said slider at a first position on said means for applying a force;

(e) measuring the magnitude of a force applied to said first rail of said slider when said slider is temporarily attached to said means for applying a force in said first position;

(f) comparing the magnitude of said force applied to said first rail of said slider as measured in step (e) to said magnitude of force determined in step (c); and (g) if the magnitude of said force applied to said first rail of said slider as measured in step (e) is within a predetermined amount of the magnitude of force determined in step (c), permanently attaching said slider to said means for applying a force at said first position.

2. The method of claim 1 further comprising the steps of:

(h) if the magnitude of said force applied to said first rail of said slider as measured in step (e) is not within a predetermined amount of the magnitude of force determined in step (c), removing said slider from said means for applying a force;

(i) re-positioning said slider and temporarily re-attaching said slider at a second position on said means for applying a force;

(j) measuring the magnitude of a force applied to said first rail of said slider when said slider is temporarily attached to said means for applying a force in said second position;

(k) comparing said force applied to said first rail of said slider as measured in step (j) to said magnitude of force determined in step (c); and (l) if the magnitude of said force applied to said first rail of said slider as measured in step (j) is within a predetermined amount of the magnitude of force determined in step (c), permanently attaching said slider to said means for applying a force at said second position.

3. The method of claim 2 further comprising the steps of:

(m) if the magnitude of said force applied to said first rail of said slider as measured in step (j) is not within a predetermined amount of the magnitude of force determined in step (c), removing said slider from said means for applying a force;

(n) repeating steps (i), (j) and (k) N times until said slider is temporarily attached to said means for applying a force at a Nth position where the magnitude of said force applied to said first rail of said slider as measured in the step of measuring is within a predetermined amount of the magnitude of force determined in step (c); and (o) permanently attaching said slider to said means for applying a force at said Nth position.

4. The method of claims 1, 2, or 3 wherein said slider is temporarily attached to said means for applying a force by an adhesive which hardens when exposed to ultraviolet radiation, said adhesive being exposed to ultraviolet radiation only after said slider has been positioned in said position where the magnitude of said force applied to said first rail of said slider as measured in the step of measuring is within a predetermined amount of the magnitude of force determined in step (c).

5. The method of claim 1 wherein:

said means for applying a force to said slider comprises a load arm and a flexure; and said step of attaching said slider to said means for applying a force further comprises:
attaching said slider to said flexure; and
attaching said flexure to said load arm.

6. The method of claim 1 wherein:

said predetermined distance between said first rail of said slider and said surface of said magnetic media is predetermined based on:
the recording density of the magnetic media, speed of the magnetic media with respect to said slider, and the characteristics of said read/write transducer.

7. The method of claim 1 wherein:

said step of measuring the magnitude of said force applied to said first rail of said slider is performed using a load transducer.

8. The method of claim 1 wherein:

in said slider provided in step (a) said planform area of a second rail of said at least two rails is different than said planform area of said first rail so that during system operation the aerodynamic force acting on said second rail planform surface is different in magnitude from the aerodynamic force acting on said first rail planform surface.

9. The method of claim 8 wherein:

said planform area of said second rail is selected to differ from said planform area of said first rail so that during system operation the distance between said second rail and said magnetic media is greater than the distance between said first rail and said magnetic media.

\* \* \* \* \*